United States Patent
Zhou et al.

(10) Patent No.: US 12,421,417 B2
(45) Date of Patent: Sep. 23, 2025

(54) THERMOSETTING COATING COMPOSITION WITH IMPROVED SCRATCH RESISTANCE

(71) Applicant: EASTMAN CHEMICAL COMPANY, Kingsport, TN (US)

(72) Inventors: Jianhui Zhou, Kingsport, TN (US); Stacey James Marsh, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 540 days.

(21) Appl. No.: 17/475,890

(22) Filed: Sep. 15, 2021

(65) Prior Publication Data

US 2022/0002579 A1 Jan. 6, 2022

Related U.S. Application Data

(63) Continuation of application No. 17/250,989, filed as application No. PCT/US2019/054915 on Oct. 7, 2019.

(60) Provisional application No. 62/744,171, filed on Oct. 11, 2018.

(51) Int. Cl.
*C09D 167/02* (2006.01)
*C08G 63/199* (2006.01)
*C09D 7/20* (2018.01)

(52) U.S. Cl.
CPC ......... *C09D 167/02* (2013.01); *C08G 63/199* (2013.01); *C09D 7/20* (2018.01)

(58) Field of Classification Search
CPC .................................................. C09D 167/02
See application file for complete search history.

(56) References Cited

U.S. PATENT DOCUMENTS

| | | | |
|---|---|---|---|
| 4,397,989 | A | 8/1983 | Adesko |
| 5,474,811 | A | 12/1995 | Rehfuss et al. |
| 5,593,785 | A | 1/1997 | Mayo et al. |
| 8,163,850 | B2 | 4/2012 | Marsh et al. |
| 8,168,721 | B2 | 5/2012 | Marsh et al. |
| 9,029,460 | B2 | 5/2015 | Marsh et al. |
| 9,029,461 | B2 | 5/2015 | Marsh et al. |
| 10,011,737 | B2 | 7/2018 | Zhou et al. |
| 10,676,565 | B2 | 6/2020 | Zhou et al. |
| 2005/0148704 | A1 | 7/2005 | Weingartz |
| 2007/0083014 | A1 | 4/2007 | Boisseau et al. |
| 2010/0204388 | A1 | 8/2010 | Marsh et al. |
| 2014/0242272 | A1 | 8/2014 | Sherwood et al. |
| 2014/0296406 | A1 | 10/2014 | Marsh et al. |
| 2016/0340471 | A1 | 11/2016 | Zhou et al. |
| 2017/0275492 | A1 | 9/2017 | Zhou et al. |
| 2018/0105640 | A1 | 4/2018 | Zhou et al. |
| 2021/0348016 | A1 | 11/2021 | Zhou et al. |
| 2021/0348017 | A1 | 11/2021 | Marsh et al. |
| 2021/0380835 | A1 | 12/2021 | Geiger et al. |
| 2022/0002579 | A1 | 1/2022 | Zhou et al. |

FOREIGN PATENT DOCUMENTS

| | | |
|---|---|---|
| WO | WO 2010/090713 A1 | 8/2010 |
| WO | WO 2016-187095 A1 | 11/2016 |
| WO | WO 2020-076661 A1 | 4/2020 |
| WO | WO 2020-076664 A1 | 4/2020 |

OTHER PUBLICATIONS

Notification of Transmittal of the International Search Report and the Written Opinion of the International Searching Authority, or the Declaration date of mailing Dec. 18, 2019 received in International Application No. PCT/US2019/054915.
Notification of Transmittal of the International Search Report and the Written Opinion of the International Searching Authority, or the Declaration date of mailing Jan. 2, 2020 received in International Application No. PCT/US2019/054917.
Notification of Transmittal of the International Search Report and the Written Opinion of the International Searching Authority, or the Declaration date of mailing Jan. 2, 2020 received in International Application No. PCT/US2019/054918.
Co-pending U.S. Appl. No. 17/250,989, filed Apr. 8, 2021; Zhou et al., now US Patent Publication No. 2021-0348016.
Co-pending U.S. Appl. No. 17/250,990, filed Apr. 8, 2021; Marsh et al., now US Patent Publication No. 2021-0348017.
Co-pending U.S. Appl. No. 17/250,991, filed Apr. 8, 2021; Geiger et al., now US Patent Publication No. 2021-0380835.
Resins for Surface Coatings, vol. II, p. 121-210, edited by P. Oldring and G. Hayward, SITA Technology, London, UK, 1987.
Resins for Surface Coatings, vol. III, p. 63-167, edited by P. Oldring and G. Hayward, SITA Technology, London, UK, 1987.
Bayer Material Science, The Chemistry of Polyurethane Coatings, Technical Publication p. 20, 2005.
Wicks et al., Organic Coatings, Science and Technology, 2nd edition, p. 246-257, Wiley-Interscience, New York, 1999.
USPTO Office Action dated Jan. 24, 2024 received in Co-pending U.S. Appl. No. 17/250,989.
USPTO Office Action dated Feb. 8, 2024 received in Co-pending U.S. Appl. No. 17/250,991.
USPTO Office Action dated Mar. 27, 2024 received in co-pending U.S. Appl. No. 17/250,990.

(Continued)

*Primary Examiner* — Vickey Nerangis
(74) *Attorney, Agent, or Firm* — Polly C. Owen; Judith C. Rawls

(57) ABSTRACT

This invention relates to aliphatic, carbamate-functional polyester resins for use in coatings. More particularly this invention relates to aliphatic, carbamate-functional polyester resins containing 2,2,4,4-tetramethyl-1,3-cyclobutanediol (TMCD) that exhibit improved scratch resistance and acid etch resistance when formulated into 2K automotive clearcoats. These carbamate-functional polyesters can be used as the sole resin in the clearcoat binder or in combination with other carbamate-functional acrylic resins and/or hydroxyl-functional acrylic and polyester resins.

15 Claims, No Drawings

(56) References Cited

OTHER PUBLICATIONS

USPTO Office Action dated Oct. 7, 2024 received in Co-pending U.S. Appl. No. 17/250,989.
Notice of Allowance dated Nov. 6, 2024 received in Co-pending U.S. Appl. No. 17/250,990.
Notice of Allowance dated Sep. 10, 2024 received in co-pending U.S. Appl. No. 17/250,991.

THERMOSETTING COATING COMPOSITION WITH IMPROVED SCRATCH RESISTANCE

CROSS-REFERENCE TO RELATED APPLICATIONS

This application is a continuation application of U.S. patent application Ser. No. 17/250,989 filed Apr. 8, 2021, which, in turn, is a National Stage Entry application of International Patent Application No. PCT/US2019/054915, filed on, Oct. 7, 2019 which claims priority from U.S. Provisional Application No. 62/744,171, filed on Oct. 11, 2018, the entire disclosures of which are incorporated by reference herein.

FIELD OF THE INVENTION

This invention relates to a thermosetting coating composition comprised of at least a polyester polyol and a cross linker. The polyester polyol is comprised of monomers including a 2,4,4-tetraalkylcyclobutane-1,3-diol (TACD) and an alicyclic diacid in certain ratios. The inventive coating compositions exhibit improved balance of tree resin resistance and scratch resistance over the comparative conventional coatings made from polyester polyols that do not contain TACD or outside of the hydroxyl value range for those materials that do contain TACD. The tree resin resistance of the inventive coatings is significantly improved when formulated with polyesters as defined in component A of the inventive formulation.

BACKGROUND OF THE INVENTION

Over many years of effort from automotive coating industry, chemical resistance, particularly sun tan lotion and tree resin resistance, and scratch resistance remain the top desired improvements. Increased environmental pressure to reduce VOC and increase coating solids has forced formulators to adopt low molecular weight polymers, which adversely impacts scratch resistance. Therefore a need exists for a thermosetting coating composition that exhibits an improved balance of tree resin resistance and scratch resistance.

SUMMARY OF THE INVENTION

This invention describes a thermosetting coating composition comprised of at least a polyester polyol and a cross linker. The polyester polyol is made of monomers including a 2,4,4-tetraalkylcyclobutane-1,3-diol (TACD) and an alicyclic diacid in certain ratios. The inventive coating compositions exhibit improved balance of tree resin resistance and scratch resistance over the comparative conventional coatings made from polyester polyols that do not contain TACD or are outside of the hydroxyl value range for those materials that do contain TACD. The tree resin resistance of the inventive coatings is significantly improved when formulated with polyesters as defined in component A of the inventive formulation.

The invention is as set forth in the appended claims.

In an embodiment the present invention provides a coating composition comprising:
  A. 40 to 70 weight percent, based on the total weight of (A) and (C), of at least one curable, aliphatic polyester, comprising residues of:
    i. a hydroxyl component, said hydroxyl component comprising the residues of:
      a. from 10 to 85 mole %, based on the total moles of (a) and (b), of 2,2,4,4-tetraalkylcyclobutane-1,3-diol (TACD); and
      b. from 15 to 90 mole %, based on the total moles of (a) and (b), of other diols and polyols;
    ii. a diacid component, said diacid component comprising the residues of at least one aliphatic dicarboxylic acid comprising:
      c. 60 to 100 mole %, based on the total moles of the diacids (c) and (d), of an alicyclic dicarboxylic acid; and
      d. 0 to 40 mole %, based on the total moles of the diacids (c) and (d), of an acyclic aliphatic diacid;
    wherein the curable polyester has a hydroxyl number of 120 to 350 mgKOH/g of polyester, and an acid number of 0 to 15 mgKOH/g;
  B. from 30 to 60 weight percent, based on the total weight of (A) and (B), of a crosslinker;
  C. from 35 to 60 weight percent, based on the total weight of the coating composition, of a solvent other than water.

In an embodiment of the invention the coating composition has a tree sap resistance of greater than 70 degree C. as determined in accordance with Temperature-gradient oven method according to DIN EN ISO 2812-5:2007-05, wherein said cured coating has a gloss retention, based on simulated carwash test using a Sheen Wet Abrasion Scrub Tester Machine with Brush ID 42472 and tested according to DIN EN ISO 20566, of greater than 75%, and wherein said cured coating has fracture resistance greater than 20 mN when tested using a Nano scratch tester with 2 μm Indenter per ASTM D7187-15.

In another embodiment the invention provides a coating composition comprising:
  I. A polyester component comprising:
    A. 40 to 70 weight percent, based on the total weight of (A) and (C), of at least one curable, aliphatic polyester, comprising residues of:
      i. a hydroxyl component, said hydroxyl component comprising the residues of:
        a. from 10 to 85 mole %, based on the total moles of (a) and (b), of 2,2,4,4-tetraalkylcyclobutane-1,3-diol (TACD);
        b. from 15 to 90 mole %, based on the total moles of (a) and (b), of other diols and polyols; and
      ii. a diacid component comprising the residues of at least one aliphatic dicarboxylic acid comprising:
        c. 60 to 100 mole %, based on the total moles of the diacids (c) and (d), of an alicyclic dicarboxylic acid; and
        d. 0 to 40 mole %, based on the total moles of the diacids (c) and (d), of an acyclic aliphatic diacid;
    wherein the curable polyester has a hydroxyl number of 120 to 350 mgKOH/g of polyester, and an acid number of 0 to 15 mgKOH/g;
    B. from 30 to 60 weight percent, based on the total weight of (A) and (B), of a crosslinker;
    C. from 35 to 60 weight percent, based on the total weight of the coating composition, of a solvent other than water; and
  II. a hydroxyl functional TSA resin component.

In yet another embodiment, the invention coating has a polyester component from 30 to 100 weight percent and a hydroxyl functional TSA resin component from 0 to 70 weight percent based on the total weight percent of polyester and hydroxyl functional TSA resin in the coating composition.

In yet another embodiment, the invention coating has a polyester component from 15 to 100 weight percent and a hydroxyl functional TSA resin component from 0 to 85 weight percent based on the total weight percent of polyester and hydroxyl functional TSA resin in the coating composition.

DETAILED DESCRIPTION

Unless otherwise indicated, all numbers expressing quantities of ingredients, properties such as molecular weight, reaction conditions, and so forth used in the specification and claims are to be understood as being modified in all instances by the term." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable, aliphatic polyester", as used herein, is synonymous with the term "resin" and is intended to mean a thermosetting surface coating polymer prepared by the polycondensation of one or more acid components and hydroxyl components. The curable, aliphatic polyester of the present invention is a thermoset polymer and is suitable as a resin for solvent-based coatings and more specifically mono-coat applications. This polyester has a low molecular weight, typically 500 to 10,000 daltons, and would not be suitable for fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999, the entire disclosure of which is incorporated herein by reference.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid or 1,3-cyclohexanedicarboxylic acid, or a mixture of one or more aliphatic and cycloaliphatic acids. The hydroxyl component comprises diols and polyols. The diols may comprise one or more cycloaliphatic diols such as, for example, 2,2,4,4-tetramethyl-1,3-cyclobutanediol, either alone or in combination with one or more linear or branched aliphatic diols such as, for example, neopentyl glycol. Catalysts may be used to accelerate the rate of the polycondensation reaction. Additional examples of acid components and hydroxyl components, other than TMCD of the curable, aliphatic polyester include those known in the art including, but not limited to, those discussed below, and in various documents known in the art such as, for example, in *Resins for Surface Coatings*, Vol. III, p. 63-167, ed. by P. K. T. Oldring and G. Hayward, SITA Technology, London, U K, 1987, the disclosure of which is incorporated herein by reference.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "cycloaliphatic", as used herein, is intended to mean an aliphatic, cyclic compound. The term "aliphatic polyester", as used herein, is understood to mean a polyester that contains 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic polyester is essentially free, i.e., having less than 1 mole % of aromatic diacid and/or aromatic diol residues.

In one embodiment, this invention provides a coating comprising:
A. 40 to 70 weight percent, based on the total weight of (A) and (C), of at least one curable, aliphatic polyester, comprising residues of:
  i. a hydroxyl component, said hydroxyl component comprising the residues of:
    a. from 10 to 85 mole %, based on the total moles of (a) and (b), of 2,2,4,4-tetraalkylcyclobutane-1,3-diol (TACD); and
    b. from 15 to 90 mole %, based on the total moles of (a) and (b), of other diols and polyols;
  ii. a diacid component comprising the residues of at least one aliphatic dicarboxylic acid comprising:
    c. 60 to 100 mole %, based on the total moles of the diacids (c) and (d), of an alicyclic dicarboxylic acid; and
    d. 0 to 40 mole %, based on the total moles of the diacids (c) and (d), of an acyclic aliphatic diacid;
  wherein the curable polyester has a hydroxyl number of 120 to 350 mgKOH/g of polyester, and an acid number of 0 to 15 mgKOH/g;
B. from 30 to 60 weight percent, based on the total weight of (A) and (B), of a crosslinker comprising an isocyanate;
C. from 35 to 60 weight percent, based on the total weight of the coating composition, of a solvent other than water; and
wherein said coating has a tree sap resistance of greater than 70 degree C. as determined in accordance with Temperature-gradient oven method according to DIN EN ISO 2812-5:2007-05, wherein said cured coating has a gloss retention, based on simulated carwash test using a Sheen Wet Abrasion Scrub Tester Machine with Brush ID 42472 and tested according to DIN EN ISO 20566, of greater than 75%, and wherein said cured coating has fracture resistance greater than 20 mN when tested using a Nano scratch tester with 2 μm Indenter per ASTM D7187-15.

TACD is a diol and can be represented by the general structure:

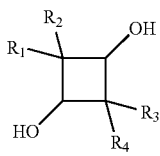

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. TMCD is most preferred.

The diols in (b) have 2 hydroxyl groups and can be branched or linear, saturated or unsaturated, aliphatic or cycloaliphatic C2-C20 compounds, the hydroxyl groups being primary, secondary, and/or tertiary, desirably primary. Examples of diols (b) include 2,2-dimethyl-1,3-propanediol (neopentyl glycol), 1,2 cyclohexane¬dimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid (dimethylolpropionic acid).

Desirably, the diols (b) are 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. Desirably, at least one of the diols is neopentyl glycol.

The polyols in (b) having 3 or more hydroxyl groups can be saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyols are hydrocarbons and do not contain atoms other than hydrogen, carbon and oxygen. Examples of the polyol include 1,1,1-trimethylolpropane (TMP), 1,1,1-trimethylolethane, glycerin, pentaerythritol, erythritol, threitol, di-pentaerythritol, sorbitol, mixtures thereof, and the like. Desirably, the polyol is TMP.

The alicyclic diacid in ii (c) is a cyclic aliphatic dicarboxylic acid compound, its diester derivative, its anhydride, or a combination thereof. Suitable alicyclic diacid compounds include compounds having two carboxylic acid groups, their diester derivatives, and their anhydrides. The dicarboxylic acid compounds can form ester linkages with diol or polyol compounds. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

Suitable alicyclic diacids include, but are not limited to, 1,4 cyclohexanedicarboxylic acid, 1,3 cyclohexanedicarboxylic acid, hexahydrophthalic anhydride (HHPA), methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof. HHPA is the most desired alicyclic diacid.

The acyclic aliphatic diacid in ii(d) is an open-chain aliphatic dicarboxylic acid compound, its diester derivative, its anhydride, or a combination thereof. Examples of acyclic aliphatic diacids include succinic acid, adipic acid, maleic anhydride, maleic acid, fumaric acid, itaconic anhydride, itaconic acid, citraconic anhydride, citraconic acid, dodecanedioic acid, sebacic acid, azelaic acid, and the like. Adipic acid is most preferred.

The aliphatic dicarboxylic acid comprising from 60 to 100 mole %, based, on the total moles of the diacids (c) and (d), of an alicyclic dicarboxylic acid and 0 to 40 mole %, based on the total moles of the diacids (c) and (d), of an acyclic aliphatic diacid.

The hydroxyl number of the curable polyester A of the present invention is from about 100 to about 370, from about 120 to about 350 mgKOH/g. The acid number is from 0 to about 30, from about 2 to about 25, from 2 to about 15, KOH/g.

The number average molecular weight (Mn) of the curable polyester A of the present invention may be from 500 to 10,000, from 800 to 6,000, or from 1,000 to 3,000 g/mole. The weight average molecular weight (Mw) of the curable polyester of the present invention may be from 1,000 to 14,000, from 1,500 to 6,000, or from 2,000 to 4,000 g/mole. Molecular weights are measured by gel permeation chromatography (GPC) using polystyrene equivalent molecular weight.

The glass transition temperature (Tg) of the curable polyester A of the present invention may be from −20° C. to 55° C., from −10° C. to 45° C., or from −5° C. to 45° C.

The crosslinker is desirably an isocyanate or isocyanurate type. Suitable isocyanates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4', 4"-triisocyanate, tetramethyl xylene diisocyanate, metaxylene diisocyanate, and polyisocyanates. There can also be employed isocyanate terminated adducts of diols and polyols, such as ethylene glycol, 1,4-butylene glycol, trimethylol propane, etc. These are formed by reacting more than one mole of a diisocyanate, such as those mentioned, with one mole of a diol or polyol to form a higher molecular weight isocyanate prepolymer with a functionality of 2 to 3. Examples include those isocyanate crosslinkers under the Desmodur and Mondur trade names from Covestro LLC. Where isocyanates are used as crosslinkers, it is preferred to use aliphatic isocyanates, since they provide better outdoor durability and color stability in the cured coating. Examples include 1,6-hexamethylene diisocyanate, 1,4-butylene diisocyanate, methylene bis (4-cyclohexyl isocyanate) and isophorone diisocyanate. Mixtures of isocyanate crosslinkers can also be employed. The desirable isocyanate crosslinkers also include modified isocyanates, for example, carbodiimide modified isocyanates, siliane modified isocyanates, and blocked issocyanates.

The thermosetting coating composition of the invention may further contain one or more other crosslinkers known in the art that could react with hydroxyl groups or residual acid groups of the inventitive polyesters. One example is melamine or "amino" type crosslinkers that can react with hydroxyl groups. Another example is epoxides that could react with residual acid groups.

Stoichiometric calculations for the polyester resin and isocyanate reaction are known to those skilled in the art and are described in The Chemistry of Polyurethane Coatings, Technical Publication p. 20, by Bayer Material Science, 2005, incorporated herein by reference. Theoretically, crosslinking between the polyester resin and isocyanate reaches maximum molecular weight and optimal properties associated with molecular weight when one equivalent of isocyanate (NCO) reacts with one equivalent of hydroxyl (OH), which is when the NCO to OH ratio is 1.0/1.0. It is common practice to use a small excess of isocyanate, about 5-10%, to allow for the likely consumption of isocyanate by moisture from the atmosphere, solvents and pigments. It is sometimes desirable to vary the NCO to OH ratio less than 1.0/1.0 to improve flexibility or greater than 1.0/1.0 for harder, more chemical resistant and more weather resistant coatings. In the case where melamine is used as a co-crosslinker, the isocyanate content should be reduced accordingly to leave some hydroxyl groups available for the melamine to react with.

In another aspect, this invention further provides a curable coating composition further comprising one or more crosslinking catalysts. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, I,8-diaza-bichloro[5,40]-undecene-7 N-methyl diethanolamine, N,N-dimethyl ethanolamine, N,N-diethyl cyclohexylamine, N,N,N'N'-tetramethyl-ethylene diamine, I,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate. Particularly useful, for the present invention, is dibutyl tin dilaurate (DBTDL). Useful amounts of catalyst will be about 0.01 to 5%, based on the total weight of the resin solids. In the case where melamine is used as a co-crosslinker, an acid type catalyst is also desirable. Examples of catalysts for crosslinking melamine or "amino" crosslinkers with hydroxyl-terminated polyester resins include p-toluenesulfonic acid, dodecylbenzene sulfonic (DDBSA), dinonylnaphthalene sulfonic acid (DNNSA) and dinonylnaphthalene disulfonic acid (DNNDSA) such as Nacure 155, 5076, 1051, and 5225 catalysts sold by King Industries and BYK-Catalysts sold by BYK-Chemie USA. These catalysts may be unblocked or blocked types.

Additional additives that may be included in the composition described herein include UV inhibitors, wetting agents, flow agents, defoamers, flattening agents, rheology control agents, anti-settling, anti-sag agents and slip agents. In some useful embodiments, the coating compositions described herein may include a flattening agent. Flattening agents are generally small solid particles of material that are insoluble in water and are effective to reduce gloss. Preferably, the flattening agent particles have a size of from about 0.05 to about 10 microns but may be present in clumps or agglomerates of up to about 50 microns. The flattening agent particles may be inorganic or organic. Examples of suitable inorganic flattening agents include silicates, such as talc, and various forms of silica, such as amorphous, aerogel, diatomaceous, hydrogel and fumed silicas. Examples of suitable organic flattening agents include insoluble urea-formaldehyde resins, polyethylene, polypropylene, cellulosic fibers and polyurethane/polyurea copolymers.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®, diethyl-3acetyl-4-hydroxy-benzyl-phosphonate, 4-dodecyloxy-2-hydroxy benzophenone, and resorcinol monobenzoate.

If desired, the coating compositions can comprise other functional materials such as pigments, abrasion resistant particles (like NANOBYK from BYK), anti-oxidants, thixotropic agents, fillers. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the coating composition.

Any solvent that will enable the formulation to be coated on a substrate may be used, and these will be well known to the person skilled in the art. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The amount of organic solvent can be up to 60 wt. % based on the total weight of the coating composition The coating composition may also contain one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®, diethyl-3acetyl-4-hydroxy-benzyl-phosphonate, 4-dodecyloxy-2-hydroxy benzophenone, and resorcinol monobenzoate.

The thermosetting coating composition of this invention may optionally comprise thermosetting acrylic ("TSA") resins. Such TSA resins are typically prepared by free radical polymerization in bulk or in a solvent. Initiators are of the free radical type and are usually organic peroxides or azo compounds, such as benzoyl peroxide, t-butyl hydroperoxide, t-butyl peroxide, t-butyl peroxybenzoate, azobisisobutyronitrile, and 2,2'-azobis(2,4-dimethyl)-valeronitrile. The reaction is preferably carried out at the reflux temperature of the solvent used, which is generally higher than the thermal decomposition temperature of the initiator employed. The acrylic resin is composed of ethylenically unsaturated monomers that include acrylate, methacrylate, styrene, (meth) acrylic acid, and vinyl esters. They further contain hydroxyl, epoxy, carboxyl, blocked-phenol and/or acetoacetoxy functional groups. Suitable examples of preparation methods and components of the acrylic resin include those known in the art including, but not limited to, those described above, and in Resins for Surface Coatings, Vol. II, p. 121-210, ed. by P. K. T. Oldring and G. Hayward, SITA Technology, London, U K, 1987.

Examples of hydroxyl functional TSA resins include the Setalux™ series from Annex; the MACRYNAL™ series, available from Cytec Surface Specialties; the ACRYLOID™ series, available from Rohm and Haas; and the JONCRYL™ series, available from BASF Corporation. One specific example of a hydroxyl functional TSA resin used is MACRYNAL™ SM 515/70BAC, available from Cytec Surface Specialties.

The hydroxyl functional TSA resins can be blended with inventive polyesters to make thermosetting coating composition of this invention. The weight percent of the hydroxyl functional TSA resins in the blend can be up to about 85%.

Thus another embodiment of this invention provides a coating composition comprising:
I. A polyester component comprising:
   A. 40 to 70 weight percent, based on the total weight of (A) and (C), of at least one curable, aliphatic polyester, comprising residues of:
      i. a hydroxyl component, said hydroxyl component comprising the residues of:
         a. from 10 to 85 mole %, based on the total moles of (a) and (b), of 2,2,4,4-tetraalkylcyclobutane-1,3-diol (TACD); and
         b. from 15 to 90 mole %, based on the total moles of (a) and (b), of other diols and polyols;
      ii. a diacid component, said diacid component comprising the residues of at least one aliphatic dicarboxylic acid comprising:
         c. 60 to 100 mole %, based on the total moles of the diacids (c) and (d), of an alicyclic dicarboxylic acid and
         d. 0 to 40 mole %, based on the total moles of the diacids (c) and (d), of an acyclic aliphatic diacid;
   wherein the curable polyester has a hydroxyl number of 120 to 350 mgKOH/g of polyester, and an acid number of 0 to 15 mgKOH/g;
   B. from 30 to 60 weight percent, based on the total weight of (A) and (B), of a crosslinker comprising an isocyanate;
   C. from 35 to 60 weight percent, based on the total weight of the coating composition, of a solvent other than water; and
II. a hydroxyl functional TSA resin component.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at ambient (room) temperature or heated to a temperature of about 50° C. to about 230° C., or desirably from 80° C. to 200° C., for a time period that typically ranges about 5 to about 90 minutes and allowed to cool.

The coating composition in this invention report is particularly well suited for automotive OEM (Original Equipment Manufacturer) 2K clearcoat applications. The addition of TACD chemistry can greatly improve clear coat scratch performance in automotive finishes.

EXAMPLES

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a weight basis unless otherwise stated.

Preparation of Curable Polyesters

The example (Table 1) and comparative (Table 2) polyester resins were prepared according to the following procedures. All of the resins were prepared in a two-liter reaction kettle equipped with a heating mantle, mechanical stirrer, thermocouple, nitrogen blanket, oil-heated partial condenser, condensate trap, and water-cooled total condenser.

Example Polyester 1 (PE1)

Stage 1—HHPA, TMCD, triphenylphosphite and xylene were charged to the reaction kettle. Additional xylene was used to fill the condensate trap. The temperature was increased from room temperature to 130° C. over one hour and forty five minutes. Agitation was started when the melt reached 100° C. The temperature was held at 130° C. until an acid number ≤248 mg KOH/g resin was achieved.

Stage 2—TMP (including excess) and catalyst were added to the reactor and heated to 230° C. over four hours. The reaction was held at 230° C. until a final acid number of 2 mg KOH/g resin was achieved. The resin was then cooled to 190° C. and poured through a medium mesh paint filter into a metal paint can.

Example Polyester 2 (PE2)

Stage 1—HHPA, TMCD, triphenylphosphite and xylene were charged to the reaction kettle. Additional xylene was used to fill the condensate trap. The temperature was then increased from room temperature to 150° C. over two hours. Agitation was started when the melt reached 100° C. The temperature was held at 150° C. until an acid number ≤248 mg KOH/g resin was achieved.

Stage 2—TMP and catalyst were added to the reactor and heated to 230° C. over two and a half hours. The reaction was held at 230° C. until a final acid number of 4 mg KOH/g resin, was achieved. The resin was cooled to 110° C. and adjusted to 75 weight percent solids with n-butyl acetate. It was then poured through a medium mesh paint filter into a metal paint can.

Example Polyester 3 (PE3)

Stage 1—HHPA, TMCD, triphenylphosphite and xylene were charged to the reaction kettle. Additional xylene was used to fill the condensate trap. The temperature was then increased from room temperature to 150° C. over two hours. Agitation was started when the melt reached 100° C. The temperature was held at 150° C. until an acid number ≤248 mg KOH/g resin was achieved.

Stage 2—TMP and Fascat 4100 catalyst were added to the reactor and heated to 230° C. over two and a half hours. The reaction was held at 230° C. until a final acid number of 4 mg KOH/g resin, was achieved. The resin was cooled to 110° C. and adjusted to 75 weight percent solids with n-butyl acetate. It was then poured through a medium mesh paint filter into a metal paint can.

Comparative Polyester 1 (CPE1)

Stage 1—HHPA, NPG and triphenylphosphite were charged to the reaction kettle. The temperature was then increased from room temperature to 130° C. over one hour and forty five minutes. Agitation was started when the melt reached 100° C. The temperature was held at 130° C. until an acid number ≤248 mg KOH/g resin was achieved.

Stage 2—TMP (and excess TMP), and catalyst were added to the reactor and heated to 230° C. over four hours. The reaction was held at 230° C. until a final acid number of 2 mg KOH/g resin was achieved. The resin was cooled to 190° C. and poured through a medium mesh paint filter into a metal paint can.

Comparative Polyester 2 (CPE2)

Stage 1—HHPA, TMCD, triphenylphosphite and xylene (for azeotropic distillation of water) were charged to the reaction kettle. Additional xylene was used to fill the condensate trap. The temperature was then increased from room temperature to 190° C. over two hours. Agitation was started when the melt reached 75° C. The temperature was held at 190° C. until an acid number ≤263 mg KOH/g resin was achieved. The temperature was then cooled to 165° C.

Stage 2—NPG (including excess) and catalyst were added to the reactor and then heated to 230° C. over three hours. The reaction was held at 230° C. until an acid number of ≤134 mg KOH/g resin was achieved. The temperature was then cooled to 180° C.

Stage 3—TMP was added to the reactor and heated to 230° C. over three hours. The reaction was held at 230° C. until a final acid number of 9 mg KOH/g resin, was achieved. The resin was cooled to 190° C. and poured through a medium mesh paint filter into a metal paint can.

Comparative Polyester 3 (CPE3)

Stage 1—HHPA, TMCD, triphenylphosphite and xylene were charged to the reaction kettle. Additional xylene was used to fill the condensate trap. The temperature was then increased from room temperature to 150° C. over two hours. Agitation was started when the melt reached 100° C. The temperature was held at 150° C. until an acid number ≤248 mg KOH/g resin was achieved.

Stage 2—TMP and catalyst were added to the reactor and heated to 230° C. over two and a half hours. The reaction was held at 230° C. until a final acid number of 3 mg KOH/g resin was achieved. The resin was cooled to 100° C. and adjusted to 75 weight percent solids with n-butyl acetate. It was then poured through a medium mesh paint filter into a metal paint can.

Resin Properties

The acid number (abbreviated "AN"), hydroxyl number (abbreviated "OHN"), number average molecular weight (abbreviated "$M_n$"), weight average molecular weight (abbreviated "$M_w$"), molecular weight distribution polydispersity index (abbreviated "$M_w/M_n$"), and glass transition temperature (abbreviated "$T_g$") of the polyesters are shown in Tables 1 and 2.

Acid number was determined using ASTM method D 1639.

Hydroxyl number was determined by esterifying the resin by reaction with excess acetic anhydride in pyridine and then decomposing the unreacted anhydride with water. The resulting acetic acid is then titrated with a standard solution of KOH. The number of milligrams KOH which are equivalent to one gram of resin sample is reported as the hydroxyl number.

Molecular weight was determined by gel permeation chromatography using a refractive index detector with polystyrene standards.

Residual solvent remaining in the resin from solvent processing could artificially lower the $T_g$ measurement. To obtain a more accurate $T_g$, a resin sample was first subjected to preconditioning in an oven. About 0.3 g of the resin was placed into a small aluminum weighing pan and heated for one hour at 110° C. A sample was then transferred to a differential scanning calorimeter (TA Instruments DSC Q2000 V24.9 Build 121). On the first heating cycle, the sample was heated under nitrogen atmosphere from −50° C. to 140° C. at a rate of 20° C./min. The sample was then quench cooled to −50° C. For the second heating cycle, the sample was heated under the same conditions as those used in the first heating cycle. The midpoint of the second heating cycle is reported as the $T_g$ of the sample.

TABLE 1

Example Polyester Resin Charge Weights (Grams) and Determined Resin Properties

| Polyester Resin | Example PE 1 | Example PE 2 | Example PE 3 |
|---|---|---|---|
| Stage 1 | | | |
| TMCD[a] | 379.03 | 402.05 | 419.51 |
| HHPA[b] | 810.36 | 859.58 | 896.92 |
| Triphenylphosphite | 1.89 | 1.90 | 1.90 |
| Xylene process solvent | 47.37 | 47.44 | 47.55 |
| Stage 2 | | | |
| IMP[c] | 705.23[d] | 635.85 | 585.42 |
| Fascat 4100 catalyst[e] | 1.89 | 1.90 | 1.90 |
| Total Charge (solids only) | 1898.40 | 1901.28 | 1905.65 |
| Minus Theo. Condensate | 94.62 | 97.48 | 101.85 |
| Yield (solids only) | 1803.78 | 1803.80 | 1803.80 |
| Determined Resin Properties | | | |
| AN, mg KOH/g resin | 2 | 4 | 4 |
| OHN, mg KOH/g resin | 304 | 258 | 220 |
| $M_w$ | 1988 | 2918 | 5220 |
| $M_n$ | 1016 | 1271 | 1641 |
| $M_w/M_n$ | 1.96 | 2.30 | 3.18 |
| $T_g$, ° C. | 17 | 31 | 40 |

[a]2,2,4,4-tetramethyl-1,3-cyclobutanediol (Eastman)
[b]Hexahydrophthalic anhydride (Dixie Chemical)
[c]Trimethylolpropane (Perstorp)
[d]Add 1 wt. % glycol excess based on charge weight
[e]Butylstannoic acid (PMC Organometallix)

TABLE 2

Comparative Example Polyester Resin Charge Weights (Grams) and Determined Resin Properties

| Polyester Resin | Comparative CPE 1 | Comparative CPE 2 | Comparative CPE 3 |
|---|---|---|---|
| Stage 1 | | | |
| TMCD[a] | — | 350.03 | 350.92 |
| NPG[b] | 290.75 | — | — |
| HHPA[c] | 860.71 | 784.76 | 750.27 |
| Triphenylphosphite | 1.90 | 1.59 | 1.88 |
| Xylene process solvent | — | 15.87 | 47.12 |
| Stage 2 | | | |
| NPG[b][d] | — | 126.40[d] | — |
| IMP[e] | 749.04[f] | — | 783.52 |
| Fascat 4100 catalyst[g] | 1.90 | 1.59 | 1.88 |

TABLE 2-continued

Comparative Example Polyester Resin Charge Weights (Grams) and Determined Resin Properties

| Polyester Resin | Comparative CPE 1 | Comparative CPE 2 | Comparative CPE 3 |
|---|---|---|---|
| Stage 3 | | | |
| TMP[e] | — | 325.63 | — |
| Total Charge (solids only) | 1949.30 | 1590.00 | 1888.47y6 |
| Minus Theo. Condensate | 100.50 | 86.82 | 84.72 |
| Yield (solids only) | 1848.80 | 1503.18 | 1803.75 |
| Determined Resin Properties | | | |
| AN, mg KOH/g resin | 2 | 9 | 3 |
| OHN, mg KOH/g resin | 318 | 162 | 379 |
| $M_w$ | 1791 | 3730 | 1262 |
| $M_n$ | 969 | 1586 | 804 |
| $M_w/M_n$ | 1.85 | 2.35 | 1.57 |
| $T_g$, °C. | 8 | 47 | 8 |

[a] 2,2,4,4-tetramethyl-1,3-cyclobutanediol (Eastman)
[b] 2,2-Dimethyl-1,3-propanediol (Eastman)
[c] Hexahydrophthalic anhydride (Dixie Chemical)
[d] Add 0.5 wt. % glycol excess based on charge weight
[e] Trimethylolpropane (Perstorp)
[f] Add 2 wt. % glycol excess based on charge weight
[g] Butylstannoic acid (PMC Organometallix)

Thermosetting Preparation and Evaluation

Preparation of 2K Clear Coats 2K clear coats Part A were prepared by mixing the ingredients listed in Table 3. Polyester samples prepared in table 1 and 2 were pre-dissolved into butylaetate to form 75% solid solutions. The Part A and Part B were mixed together and then the viscosity of the mixture was adjusted with aromatic 100 to 28 second measured using a #4 Ford cup.

2K Clearcoat Evaluation Results

Two type of substrates were used. For Gradient oven chemical resistance test, polished cold rolled steel test panels were used. For simulated carwash gloss retention and nano scratch tests, polished cold rolled steel test panels with electrodeposit coat and topcoated with a gray primer were used. Both panels were purchased from ACT Test Panels LLC and the steel thickness is 0.032 inch. Panels with electrodeposit coat and primer were further coated with a commercial water borne black basecoat and hard baked before applying testing clearcoats. A wire wound rod was used to apply 2K clearcoats to the substrates. The rod was selected to achieve a 40 microns dry film thickness. Coated panels were flashed 10 minutes at room temperature and then cured at 140° C. for 30 minutes.

An Erichsen Model 432 gradient oven was used for gradient oven chemical resistance test. Temperature range was set from 30 to 75° C. Testing was done according to DIN EN ISO 2812-5:2007-05. Simulated carwash test was done using a Sheen Wet Abrasion Scrub Tester Machine with Brush ID 42472 and tested according to DIN EN ISO 20566. Abrasive media used were 10% (w/w) Leneta non-abrasive type media solution in deionized water. Nano scratch test was done using a Bruker Hysitron TI 980 TriboIndenter. The parameters used were listed in the following table.

| Indenter Type | Diamond 90° conical |
|---|---|
| Indenter Radius | 2 μm |
| Begin Load | 0.1 mN |
| End Load | 40 mN |
| Scratch Length | 3 mm |
| Scratch Velocity | 3.0 mm/min |
| Loading Rate | 40.0 mN/min |

Table 4 below shows the evaluation results of the clearcoats.

TABLE 3

2K clearcoat formulations

| Ingredient | Solids | Example CC 1 | Example CC 2 | Example CC 3 | Comparative CC 1 | Comparative CC 2 | Comparative CC 3 |
|---|---|---|---|---|---|---|---|
| Part A | | | | | | | |
| 1 Example PE 1 | 75 | 600 | | | | | |
| 2 Example PE 2 | 75 | | 600 | | | | |
| 3 Example PE 3 | 75 | | | 600 | | | |
| 4 Comparative PE 1 | 75 | | | | 600 | | |
| 5 Comparative PE 2 | 75 | | | | | 600 | |
| 6 Comparative PE 3 | 75 | | | | | | 600 |
| 7 Aromatic 100 | 0 | 100 | 100 | 100 | 100 | 100 | 100 |
| 8 Xylene | 0 | 120 | 120 | 120 | 120 | 120 | 120 |
| 9 Tinstab BL 277 (1% in BAc) | 1 | 0 | 0 | 0 | 0 | 0 | 0 |
| 10 EB acetate | 0 | 40 | 40 | 40 | 40 | 40 | 40 |
| 11 10% BYK 331 in Xylene | 10 | 4.5 | 4.5 | 4.5 | 4.5 | 4.5 | 4.5 |
| 13 10% BYK 325 in Xylene | 5.2 | 8 | 8 | 8 | 8 | 8 | 8 |
| Part B | | | | | | | |
| 14 Demodur N 3390 | 90 | 555 | 471 | 402 | 581 | 270 | 692 |
| Total amount | | 1428 | 1344 | 1274 | 1453 | 1143 | 1565 |

TABLE 4

Clearcoat evaluation results

| 2K clearcoat | gradient oven tree resin | carwash gloss retention | Average Fracture Resistance (mN) |
|---|---|---|---|
| Example CC 1 | 75 | 83 | 21 |
| Example CC 2 | 75 | 85 | 27 |
| Example CC 3 | 75 | 86 | 22 |
| Comparative CC 1 | 66 | 80 | 17 |
| Comparative CC 2 | 54 | 67 | 18 |
| Comparative CC 3 | 75 | X* | 26 |

*Not tested.
Comparative CC 3 was hazy solution and formed a hazy film.
Comparative PE 3 has limited solubility in aromatic solvent or limited compatibility with isocyanate used. This may be caused by high hydroxyl number of comparative PE 3.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A coated substrate comprising a polymer film and a coating formed on at least a portion of the polymer film, wherein the coating is formed from a coating composition comprising:
   A. 40 to 70 weight percent, based on the total weight of (A) and (C), of at least one curable, aliphatic polyester, comprising residues of:
      i. a hydroxyl component, said hydroxyl component comprising the residues of:
         a. from 31 to 45 mole %, based on the total moles of (a) and (b), of 2,2,4,4-tetraalkylcyclobutane-1,3-diol; and
         b. from 55 to 69 mole %, based on the total moles of (a) and (b), of polyols selected from the group consisting of 1,1,1-trimethylolpropane, 1,1,1-trimethylolethane, glycerin, pentaerythritol, erythritol, threitol, di-pentaerythritol, sorbitol, and mixtures thereof; and
      ii. a diacid component, said diacid component comprising the residues of at least one aliphatic dicarboxylic acid comprising:
         c. 95 to 100 mole %, based on the total moles of the diacids (c) and (d), of an alicyclic dicarboxylic acid; and
         d. 0 to 5 mole %, based on the total moles of the diacids (c) and (d), of an acyclic aliphatic diacid;
      wherein the at least one curable, aliphatic polyester has a hydroxyl number of 120 to 350 mgKOH/g of polyester, a Tg of 16 to 45 degree C., and an acid number of 0 to 15 mgKOH/g;
   B. from 30 to 60 weight percent, based on the total weight of (A) and (B), of a crosslinker; and
   C. from 35 to 60 weight percent, based on the total weight of the coating composition, of a solvent other than water.

2. The coated substrate of claim 1, wherein the polymer film comprises a urethane elastomer.

3. The coated substrate of claim 2, wherein the coating composition is applied by roll-coating to form a dried coating.

4. The coated substrate of claim 3, wherein the coating has a thickness from 0.1 to 4 mils.

5. The coated substrate of claim 3, wherein the coating composition is heated to a temperature of about 50° C. to about 230° C.

6. The coated substrate of claim 3 wherein said 2,2,4,4-tetraalkylcyclobutane-1,3-diol is selected from the group consisting of 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

7. The coated substrate of claim 3 wherein said 2,2,4,4-tetraalkylcyclobutane-1,3-diol is 2,2,4,4-tetramethylcyclobutane-1,3-diol.

8. The coated substrate of claim 7 further comprising a crosslinking catalyst selected from the group consisting of triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N'N'-tetramethyl-ethylene diamine, 1,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethylimidazole, 2-methylimidazole, stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate. zinc octoate, phenyl mercuric propionate, lead octoate, lead naphthenate, and copper naphthenate.

9. The coated substrate of claim 1 wherein when said coating composition is cured, a cured coating is formed having a tree sap resistance of greater than 70 degree C. as determined in accordance with the temperature-gradient oven method according to DIN EN ISO 2812-5:2007-05.

10. The coated substrate of claim 1 wherein said 2,2,4,4-tetraalkylcyclobutane-1,3-diol is represented by the general structure:

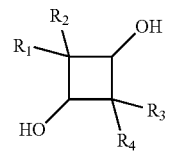

wherein R1, R2, R3, and R4 each independently represent a lower alkyl radical having 1 to 8 carbon atoms.

11. The coated substrate of claim 1 wherein said alicyclic dicarboxylic acid ii (c) is selected from the group consisting of 1,4 cyclohexanedicarboxylic acid, 1,3 cyclohexanedicarboxylic acid, hexahydrophthalic anhydride (HHPA), methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof.

12. The coated substrate of claim 11 further comprising a crosslinking catalyst selected from the group consisting of p-toluenesulfonic acid, dodecylbenzene sulfonic, dinonylnaphthalene sulfonic acid, and dinonylnaphthalene disulfonic acid.

13. The coated substrate of claim 1 wherein said acyclic aliphatic diacid ii (d) is selected from the group consisting of succinic acid, adipic acid, maleic anhydride, maleic acid, fumaric acid, itaconic anhydride, itaconic acid, citraconic anhydride, citraconic acid, dodecanedioic acid, sebacic acid, azelaic acid and mixtures thereof.

14. The coated substrate of claim 1 wherein said crosslinker is selected from the group consisting of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, and polyisocyanates.

15. The coated substrate of claim 1 wherein said crosslinker is melamine crosslinker.

* * * * *